United States Patent Office 3,315,442
Patented Apr. 25, 1967

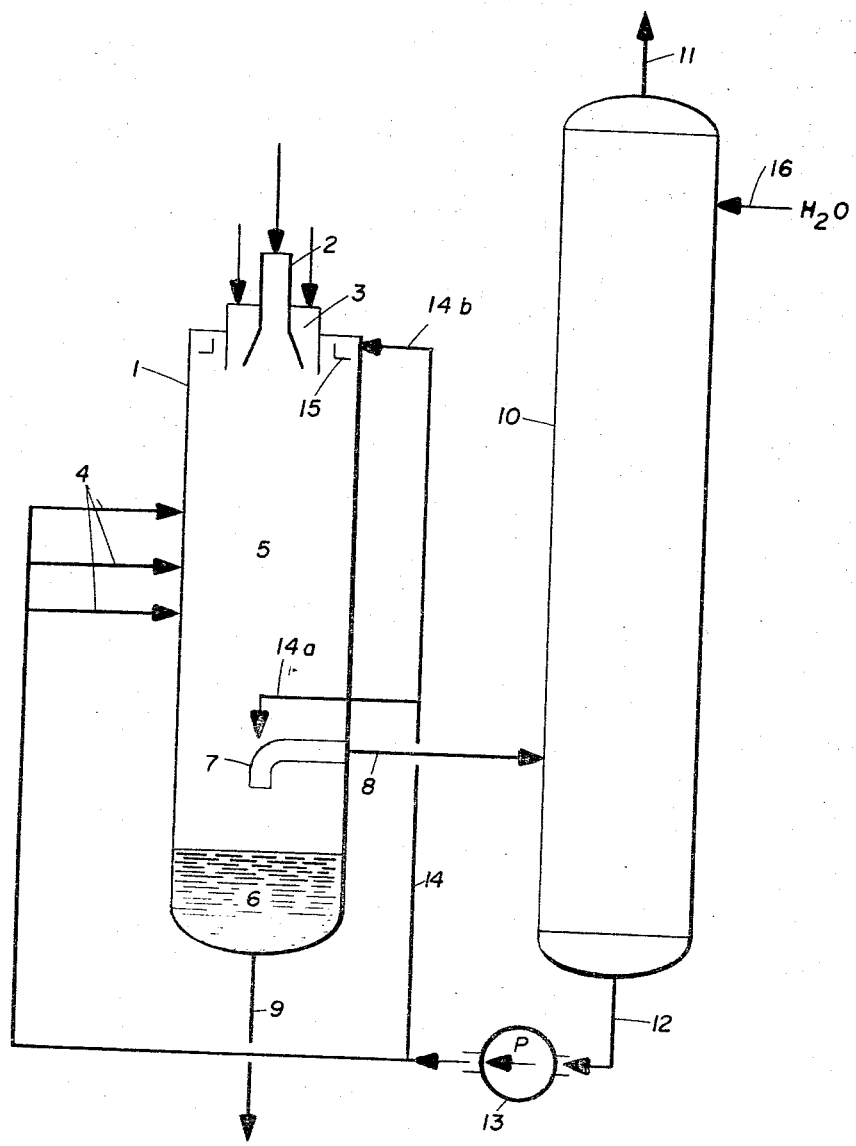

3,315,442
QUENCHING OF CRUDE MELAMINE GASES
Lun Lee Yuan, Wayne, N.J., and George Kurose, Norwalk, Conn., assignors to American Cyanamid Company, Stamford, Conn., a corporation of Maine
Filed Oct. 5, 1964, Ser. No. 401,555
2 Claims. (Cl. 55—70)

The present invention relates to the purification of melamine. More particularly, the instant discovery concerns the separation of melamine from reaction product gases. Still more particularly, the present invention relates to the separation of melamine from ammonia and carbon dioxide.

Crude melamine prepared from urea, or the like, generally contains substantial quantities of ammonia, carbon dioxide and inert gases, and various methods have been attempted to separate these materials in a practical manner. For example, quenching these product gases in a body of water has been tried but not without certain drawbacks. In the first place, the method is slow in that a substantial volume of water is required per unit volume of product gas. Another method involves spraying these product gases into a relatively cool empty chamber and allowing the melamine to desublime in the chamber while simultaneously removing carbon dioxide and ammonia gases. The disadvantage to this method is that melamine sticks to every nook and cranny of the chamber, including the conduit through which it is fed to the chamber, and must be physically scraped from the walls and conduit. Furthermore, this caking about the feed conduit eventually causes plugging.

According to the present invention, reaction product gases having a temperature in the range of approximately 310° C. to 400° C., and containing melamine, ammonia, carbon dioxide, and inert gases are introduced into a zone of sprayed water, the resulting melamine slurry collected essentially as formed, said slurry containing ammonia and carbon dioxide in the mole ratio of less than about 5 to 1, generally from about 3.5 to 1 to 2 to 1. This slurry collects in a pool below the zone of sprayed water and residual ammonia and carbon dioxide not entrained in the slurry is removed from above the pool and passed to another zone (absorber) where it is cooled with $H_2O$ to a temperature in the range about 37° C. to about 85° C., free gaseous ammonia and inert gases being taken overhead from this zone and the remaining aqueous solution (containing ammonia, carbon dioxide and minor amounts of melamine) used to form the zone of sprayed water described hereinbefore. The sprayed water fed to this zone likewise has a temperature in the range of about 37° C. to about 85° C.

It is essential that desublimation of melamine in the reaction product gases be kept to a minimum prior to injecting these gases into the zone of sprayed water. Caking caused by desublimation can be substantially eliminated, as will be seen hereinafter, by blanketing the stream of product gases, say with ammonia gas, or the like, substantially until the stream is introduced into the zone of sprayed water. If desired, a fraction of the recycled aqueous solution from the absorber zone may be used to blanket the blanket of ammonia gas. This will be more understandable hereinafter.

By the same token, also, the reaction product gases are best kept at a temperature above the dewpoint of melamine essentially until they are injected into the zone of sprayed water. This temperature varies as the pressure in the zone, but is generally above about 330° C. Obviously, at elevated pressures (e.g., up to about 200 pounds per square inch gauge, or higher) correspondingly elevated temperatures are suitable, say, greater than about 400° C. Generally, pressures in the range of 5 to 18 pounds per square inch gauge are employed, but good results are achieved at lower pressures or at higher pressures.

It should be here noted that lower temperatures yield a slurry having a higher $NH_3/CO_2$ ratio; consequently, close control over this ratio may be exercised by adjusting reaction conditions. Optimum conditions yield a melamine slurry with an $NH_3/CO_2$ content which is suitable, once recovered from the slurry in a conventional manner, for use in producing urea.

The present invention will best be understood from FIGURE I of the accompanying flow sheet. Crude melamine gases containing ammonia, carbon dioxide and inert gases and having a temperature in the range of 310° C. to 400° C. are introduced into quencher 1 through conduit 2 as shown in the drawing. A blanket of ammonia gas, which need not be preheated, is fed to quencher 1 through annular space 3. Multiple conduits 4 containing an aqueous solution having a temperature in the range of 37° C. to 85° C., preferably 50° C. to 75° C., provide the spraying action required in zone 5 of quencher 1 and reduce the temperature of the reaction products to no less than about 37° C., the resulting slurry collecting in the bottom of the quencher in a pool 6. At this temperature gaseous ammonia, carbon dioxide and inert gases escape from the reaction products through conduit 7, as shown, passing out of the quencher via line 8 to absorber 10. The resulting pool 6 of melamine slurry is removed via line 9 to another unit (not shown) wherein ammonia and carbon dioxide are removed from the slurry, the ratio of $NH_3:CO_2$ being in the range given hereinabove. This ammonia and carbon dioxide mixture is thus rendered suitable for conversion to urea. Urea combined with ammonia, such as that recovered at 11, may then be used in the preparation of melamine by numerous known methods.

The gaseous $NH_3$—$CO_2$—inert gases mixture (containing small amounts of melamine) taken over at 7 passes through conduit 8 to absorber 10 where it is scrubbed with $H_2O$ entering at 16. An aqueous ammonia solution may be used in lieu of water. Overhead from the absorber at line 11 substantially pure ammonia is removed and the remaining aqueous solution removed from the bottom of absorber 10 via line 12, from whence it passes through pump 13 to spray means 4 to quencher 1, a tributary stream 14 being used to cleanse conduit 7 in quencher 1 from any desublimed melamine solids or other solids, this being accomplished through line 14(a). Likewise, line 14 leads to line 14(b) which conducts a certain portion of the hot solution to weir 15, thus providing a curtain or blanket of solution along the interior surfaces of quencher 1. This also prevents sticking or caking of any desublimed melamine.

Not shown in the drawing is the fact that the melamine slurry collected in pool 6—save for that which is removed at 9—can be combined with the aqueous solution from 12 and conducted to spray means 4. This makes for a more efficient quenching system.

The resulting slurry fed through spray means 4 into quencher 1 has a temperature in the range of 37° C. to 85° C.; the solution entering quencher 1 through conduits 14(a) and 14(b) is generally at a temperature in the range of 20° C. to 70° C.

The present invention will better be understood from the following illustrative example:

Quencher 1 is established having an inside diameter of about 18 inches and standing about 9½ feet high. The spray means 4 are positioned about 3 feet below the lower tip of feed gas inlet nozzle 2. Weir 15 is, as shown in FIGURE I, positioned in the uppermost portion of quencher 1 and above the lower tip of feed gas inlet nozzle 2. Feed gas inlet nozzle 2 is about 2 inches in diameter with nozzle diverging, as shown, to about a 4 inch diameter, the total nozzle extending overall about 1 foot into the top of quencher 1. Absorber 10 has an internal diameter of about 12 inches and stands about 20 feet high.

In operation, reaction product gases containing melamine, ammonia and carbon dioxide, and having a temperature of 325° C., are fed into quencher 1 through conduit 2 at the rate of about 167.4 pounds per hour. These gases have the composition given in the table below. Five spray nozzles corresponding to reference character 4 in the drawing are provided in the quencher 1, each nozzle spraying about 6 gallons per minute of aqueous slurry having a temperature of about 70° C. The pressure in the quencher 1, and particularly in the spray zone 5, is about 7 pounds per square inch gauge. The aqueous melamine slurry collected at the bottom 6 of the 9½ foot quencher contains about 6.7% melamine by weight, this slurry having a temperature of 72° C. A conduit corresponding to 7 in the drawing is provided having its opening about 1½ feet above the pool 6 upper surface. The ammonia-carbon dioxide gas removed from the quencher 1 through outlet 7 is subjected to an aqueous scrubbing action in absorber 10, substantially pure ammonia gas being taken off at 11 and the resulting aqueous solution containing only a minor amount of melamine being recycled through conduit 12 by means of pump 13. The following table teaches process conditions and material flow:

monia gas at about ambient temperature is fed to annular space 3, the amount of this gas corresponding to only a few percent of the volume of the stream of reaction product gases fed to nozzle 2, and this ammonia gas providing a blanket about said stream as it proceeds toward spray zone 5.

As is obvious from the above table better than 90% of the melamine in the feed gas entering through nozzle 2 is removed in quencher 1.

Clearly the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:
1. In the production of melamine from urea wherein a stream of crude melamine gas containing ammonia, carbon dioxide, and inert gases is introduced into a quenching zone of sprayed water whereby the gases are cooled and a slurry of purified melamine is formed, the improvement which comprises blanketing the stream of crude melamine gas with gaseous ammonia in said quenching zone.

2. The process of claim 1 wherein the blanket of ammonia gas is introduced into the quenching zone at a point adjacent the inlet of said crude melamine gas.

MATERIAL FLOW AND PROCESS CONDITIONS

| Stream Components and Conditions | Quencher | | | Absorber | |
|---|---|---|---|---|---|
| | Feed Gas (From Reactor) | Off-Gas (To Absorber) | Bottoms Effluent | Feed Liquor (From Absorber) | Feed Liquor |
| $NH_3$, pounds per hour | 119.7 | 140.9 | 40.4 | 77.2 | 4.9 |
| $CO_2$, pounds per hour | 22.8 | 15.9 | 22.8 | 16.8 | |
| Inert gas, pounds per hour | 3.0 | 4.7 | | | |
| Melamine, pounds per hour | 18.0 | | 18.0 | | |
| Urea, pounds per hour | 1.2 | | 1.2 | | |
| $H_2O$, pounds per hour | | 18.5 | 189 | 241 | 191.1 |
| Total, pounds per hour | 164.7 | 180.0 | 271.4 | 335.0 | 196.0 |
| Temperature, °C | 335 | 69 | 72 | 54 | 25 |
| Pressure, pounds per square inch gauge | 7 | 7 | 7 | 5.7 | |

Under quencher in the above table, feed gas refers to the reaction product gases introduced through nozzle 2; off-gas is that ammonia-$CO_2$ gas taken out of quencher 1 at conduit 7 and directed to absorber 10; bottoms effluent is that removed at conduit 9; and feed liquor refers to the aqueous solution leaving absorber 10 at conduit 12. Under absorber in the above table, feed liquor refers to the aqueous solution introduced into the absorber at 16. Blended with this feed liquor from absorber 10 is slurry from pool 6, the resulting mixture being used to quench the incoming (at nozzle 2) stream of hot reaction product gases and control the temperature, as indicated hereinabove, of the resulting slurry at pool 6. Of course, am-

References Cited by the Examiner
UNITED STATES PATENTS

| 2,755,887 | 7/1956 | Boatright | 55—82 |
| 3,132,143 | 5/1964 | Fogagnolo et al. | 260—249.7 |

References Cited by the Applicant
FOREIGN PATENTS 1,349,842  12/1963  France.

REUBEN FRIEDMAN, *Primary Examiner.*
SAMIH N. ZAHARNA, J. ADEE, *Assistant Examiners.*

Dedication 3,315,442. —*Lun Lee Yuan,* Wayne, N.J., and *George Kurose,* Norwalk, Conn. QUENCHING OF CRUDE MELAMINE GASES. Patent dated Apr. 25, 1967. Dedication filed Mar. 4, 1983, by the assignee, *American Cyanamid Co.*

Hereby dedicates the remaining term of said patent to the Public.
*[Official Gazette May 31, 1983.]*